Figure 1:
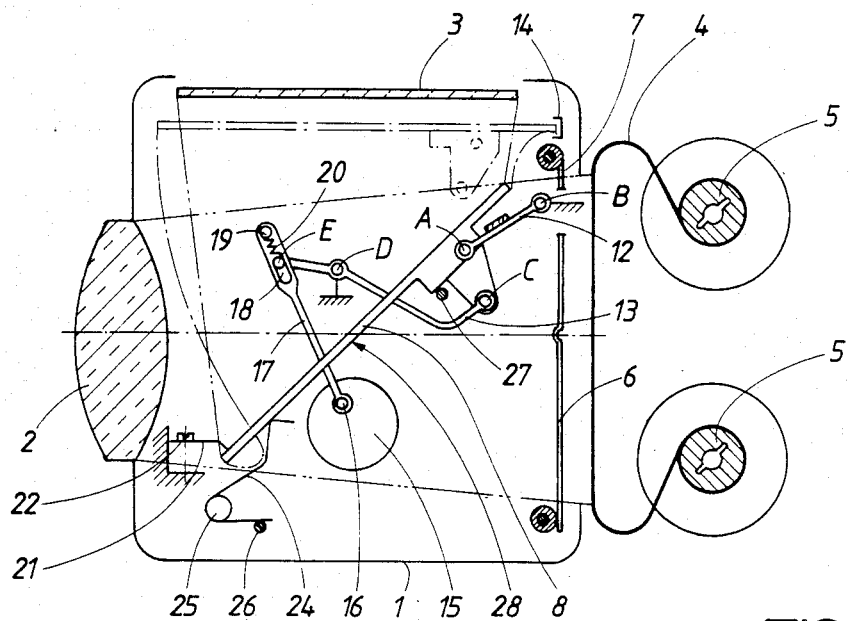

United States Patent [19]

Alfredsson

[11] Patent Number: 4,673,271

[45] Date of Patent: Jun. 16, 1987

[54] MECHANISM IN SINGLE-LENS REFLEX CAMERAS

[75] Inventor: Alf I. Alfredsson, Sävedalen, Sweden

[73] Assignee: Victor Hasselblad AB, Goteborg, Sweden

[21] Appl. No.: 784,814

[22] Filed: Oct. 4, 1985

[30] Foreign Application Priority Data

Oct. 8, 1984 [SE] Sweden ............................... 8405018

[51] Int. Cl.$^4$ ............................................ G03B 19/12
[52] U.S. Cl. ..................................... 354/152; 354/156
[58] Field of Search ............... 354/152, 153, 154, 155, 354/156, 157, 158

[56] References Cited

U.S. PATENT DOCUMENTS

| | | | |
|---|---|---|---|
| 3,468,232 | 9/1969 | Knapp | 354/156 |
| 3,532,044 | 10/1970 | Shimomura | 354/156 |
| 3,540,365 | 11/1970 | Ishizaka et al. | 354/154 |
| 3,733,988 | 5/1973 | Tenne | 354/152 |
| 4,068,246 | 1/1978 | Arai | 354/156 |
| 4,190,339 | 2/1980 | Arai | 354/156 |

Primary Examiner—A. A. Mathews

[57] ABSTRACT

A mechanism controls the movement of the mirror in single-lens reflex cameras between the exposure position and the viewing position. Articulated arms 12, 13 in the mechanism are pivotally mounted both on a mirror holder 8 and to the camera body 1. The articulated arms are of two different kinds, with at least one kind exhibiting two identical arms 12, each situated on its own side of the camera body and connected together via a parallel guide bar. The articulated arms of one kind, the front articulated arms 13, extend from the mirror holder 8 to the front of the camera body 1, and the articulated arms of the other kind, the rear articulated arms 12, extend from the mirror holder 8 towards the rear of the camera body 1. The bearings C and A in the mirror holder for each type of articulated arm are situated in the same part of the mirror holder 8, with that of the front articulated arm 13 being slightly below that of the rear arm 12, viewed from the plane of the mirror. The other bearing point B, D in the camera body in the case of at least one type of articulate arms 12, 13 is situated at a height such that the bearing A, C for each articulated arm 12, 13 in the mirror holder 8, when the mirror 9 is in its upper, exposure position, is situated above said other bearing point B, D, and, when the mirror is in its lower, viewing position, is situated below said other bearing point B, D.

2 Claims, 2 Drawing Figures

MECHANISM IN SINGLE-LENS REFLEX CAMERAS

The present invention relates to a mechanism for controlling the movement of the mirror in single-lens reflex cameras, wherein the mirror is capable of being controlled between two extreme positions, these being a lower position in which, usually at an angle of 45° to the principal direction of the optical path, it reflects the image up onto a viewfinder, and an upper position in which it forms a light-proof seal between the viewfinder and the inside of the camera body, said mechanism containing articulated arms which are pivotally mounted both on a mirror holder and to the camera body.

In the case of system cameras of the above-mentioned kind, the requirement may arise in connection with the manufacture of objectives having certain focal lengths for a rear lens to be included in the objective, which, when the objective is fitted to the camera body, will be situated a certain distance inside it. In such cases the manufacturer must make allowance for the fact that the camera has a mirror unit which is pivoted between its upper and lower position, the leading edge of which describes a curve in the process which constitutes the outermost limit of the rear boundary surface of the objective. It is accordingly desirable for the camera to be fitted with a mirror mechanism which will cause the mirror to pivot as far from the objective holder as possible, at the same time as which there is a constantly recurring requirement for the mechanism to control the mirror unit in such a way that, when in its upper position, it will produce a good light seal with the viewfinder, and when in its lower position, it is able to reflect the entire image to be photographed up onto the viewfinder.

The above problem may be solved in an elegant manner by means of a mechanism in accordance with the present invention, which is defined in the following Patent Claims and is characterized in that the articulated arms are of two different kinds, of which the articulated arms of at least one kind are two in number and are positioned symmetrically each on its own side of the camera, in which case the two articulated arms of the aforementioned kind are appropriately connected together by means of a parallel guide bar, in that the articulated arms of the one kind, the front articulated arms, extend from the mirror holder towards the front of the camera, and the articulated arms of the other kind, the rear articulated arms, extend from the mirror holder towards the rear of the camera body, in that the bearings in the mirror holder for each type of articulated arm are situated in essentially the same part of the mirror holder, with that of the front articulated arm being slightly below that of the rear arm, viewed from the plane of the mirror, and in that the other bearing point in the camera body in the case of at least one type of articulated arm is situated at a height in the camera body such that the bearing for each articulated arm in the mirror holder, when the mirror is in its upper position, is situated above said other bearing point and, when the mirror is in its lower position, is situated below said other bearing point, viewed from the top face of the camera body.

The use of this mechanism provides highly effective control of the movement of the mirror unit, at the same time as which the requirements for a full image in the viewfinder are satisfied. The mechanism also imparts a forward/upward movement to the leading edge of the mirror unit as far as its lower position, the advantages of which are described below.

Actuation of the mechanism is suitably provided by a mechanism which is characterized in that one section of a front articulated arm extends past said other bearing point for a certain distance towards the front of the camera body, and in that this section serves as a lever for the actuation of the mechanism.

In a particularly advantageous embodiment of the invention which is characterized in that the camera body is provided with at least one lower supporting point which makes contact with the upper side of the mirror holder due to the fact that it is situated a small distance outside the rear-ward- and downward-sweeping part of the curve described by the leading edge of the mirror holder as the mirror is moved from its upper to its lower position, but a small distance inside the forward- and upward-sweeping part of said curve, which the leading edge describes when the bearing points of the articulated arm in question on the mirror holder move past the level of said other bearing points, easy adjustment of the lower position of the mirror is provided. It is very important for the mirror to be correctly situated in its lower position, since the image produced by its reflection in the viewfinder is used for focussing. In previously disclosed designs it is customary for the supports which define the position of the mirror to be situated on the underside of the mirror holder, in view of the fact that its movement to the lower position, unlike the case in the design in accordance with the invention, takes place as a continuous downward movement. The mirror must, therefore, be folded up for the purpose of adjusting the supports, whereas checking must take place with the mirror folded down. Accordingly, adjustment can prove relatively trying to the patience.

In a design in accordance with the invention the image in the viewfinder can be observed during adjustment, since the means of adjustment are accessible from the top side of the mirror, for which reason adjustment can be effected very much more rapidly and more correctly.

It is preferable for the camera to be provided with two lower support points for the mirror unit. In another embodiment of the invention the camera body is provided with a sprung device, preferably a sprung arm, which is compressed by the mirror unit as it moves and affords reliable contact between the mirror and its support in the lower position.

Figure 2:
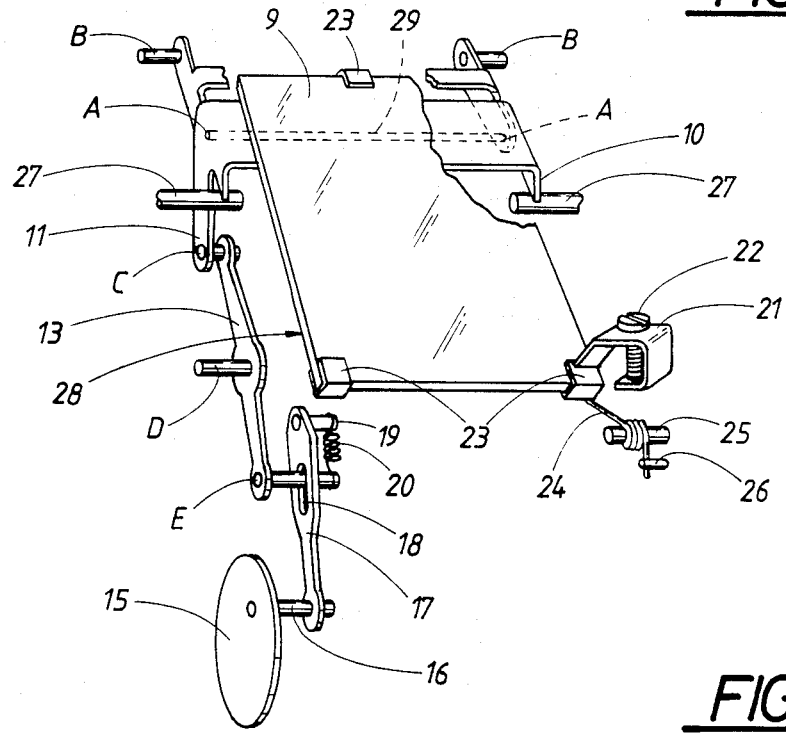

The invention is described and explained below in more detail in conjunction with the Figures contained in the accompanying drawings, of which FIG. 1 illustrates diagramatically a cross-section through a camera body fitted with a mechanism in accordance with the invention, and FIG. 2 illustrates a part of the mechanism for a mirror holder contained in the camera body.

FIG. 1 shows a camera body 1 fitted with a diagramatically represented objective 2 and a mirror unit 28. The camera is equipped with a viewfinder in the form of a viewfinder plate 3 and a film 4 which runs between two rollers 5 (the film magazine is not illustrated). On the rear edge of the camera body, ahead of the plane of the film, there are located two auxiliary shutter flaps 6 and 7, which are pivotally mounted on hinges in a previously disclosed fashion at the upper and lower parts respectively of the camera body. The attachment for the upper flap 6 is situated just below the rear part of the mirror unit in its upper position, constituting a boundary in the permissible pattern of movement of the mirror unit.

The mirror unit 28, which consists of a mirror holder 8 and a mirror 9, is able to move between two extreme positions. The upper position is indicated by a broken line, and the lower position is illustrated in the Figure. In the lower position the task of the mirror is to reflect the light arriving via the objective 2 upwards onto the viewfinder plate 3. For this purpose the surface of the mirror must reflect upwards all those rays of light which fall on the area between the broken lines drawn in the Figure from the edge of the objective 2 to the outer edges of the image frame, in such a way that the image on the viewfinder plate exhibits the same sharpness as it will exhibit on the film during subsequent exposure, that is to say that the surface of the mirror must lie in a 'bisecting plane' between the plane of the film and the plane on which the image surface of the viewfinder lies. This should be adjusted wih extreme accuracy; the method of adjustment is described later.

A connecting lug 10 and 11 extends downwards from each of the side edges on the underside of the mirror unit 28. From points of articulation A in the connecting lugs 10, 11 there extend rearwards to points of articulation B on the sides of the camera body a pair of first articulated arms 12, one on each side of the camera body from each connecting lug. The articulated arms 12 are connected to one another by means of a parallel guide bar 29. One connecting lug 11 extends further in the downward sense than the other, and there is present at its lowest part a point of articulation C, from which there extends in a forward sense another articulated arm 13, towards the front of the camera body via a point of articulation D on the side of the camera body to a point of articulation E. The points of articulation B and D are fixed inside the camera body, whereas A and C accompany the mirror unit 28 in its movements. By controlling the point of articulation E upwards and downwards, it is possible to cause the mirror unit to move from its upper position to its lower position and vice versa by means of the lever constituted by that part of the second articulated arm 13 between the points of articulation D and E and with the help of the articulated arms 12 and 13.

The fixed points of articulation B and D are located at a height above the bottom plane of the camera body 1 such that, when the mirror unit 28 is in its lower position, the points of articulation A and C are situated lower than the points of articulation B and D, and that, when the mirror unit is in its upper position, the points of articulation A and C are situated higher than the points B and D. The distance between the points A and B is slightly shorter than that between C and D. The result of this is that, when the mirror unit is moved between its extreme positions, its leading edge and its trailing edge will follow the path of the broken curves illustrated in the Figure. The trailing edge curves around the hinge for the upper auxiliary shutter flap 7 and makes contact, when the mirror unit is in its upper position, with a sealing strip 14 situated well back against the rear edge of the camera body 1, at the same time as the sides and the leading edge of the mirror unit make contact from below with other sealing strips (not shown) on the upper part of the camera body 1 in a previously disclosed fashion in the latter case.

The leading edge describes a curve which, when viewed during the movement of the mirror unit from the upper to the lower position, runs largely in a downward, rearward direction, but which, when the points of articulation A and C descend to the same level as and beyond the points of articulation B and D, is deflected in a forward, upward direction. When the mirror unit is caused to move in the other direction, an identical curve is, of course, described, but in the reverse sequence.

For the purpose of actuating the mechanism, the Figures contain a diagramatic representation of a wheel 15 with an eccentric bearing spigot 16, on which a connecting rod is mounted in an articulated fashion. The connecting rod 17 is attached in an articulated fashion at its other end to the point of articulation E on the articulated arm 13. By causing the wheel 15, which may in actual fact be a toothed wheel, to rotate, the connecting rod 17 will be caused to move up and down, when it will similarly cause the point of articulation E to move up and down, at the same time causing the mirror unit 28 to move via the articulated arm mechanism. In order to provide interruption-free transmission of the actuating force, the point of articulation E is mounted in a slot 18 in the connecting rod 17 and is pre-tensioned at its outer end 19 by means of a tensioning spring 20. So as to provide a stop and a support for the mirror unit 28 at the correct lower position in relation to the optical path, the camera body 1 is provided with two angled supporting brackets 21, one to either side, which, with the mirror unit in its lower position, make contact with the corners on the top side of its leading edge, as indicated on one side in FIG. 2. There extend downwards and through the angled supporting brackets 21 fixed adjusting screws 22 which, when screwed in and out on their threads by means of their screw heads, will cause the angled supporting brackets 21 to move downwards or upwards. It is possible in this way to adjust the mirror at each corner entirely within sufficient limits to enable it to adopt the best possible position in relation to the optical beam, as described above. The mirror unit 28 is also, not only on its top edge, but also on its lower corners, provided with additional adjustment lugs 23 of a previously disclosed kind for the adjustment of the inclination of the mirror in the mirror holder 8.

On the leading edge of the mirror unit 28 in the lower position there is arranged a supporting spring 24 which is tensioned by the mirror unit during its downward movement and before it turns to face upwards, and which, after turning has taken place, helps to provide reliable contact with the supporting points 21. The spring is attached around a pin 25 and is supported against a pin 26, both of which are attached to the camera body 1.

Support for the upper part of the mirror holder 8 with the mirror unit in its lower position is provided by a supporting pin 27 arranged on one side of the camera body 1 and bearing against the connecting lug 10 outside the plane swept by the articulated arm 13.

The invention is not restricted to the illustrative embodiment described and explained above, and many modifications are conceivable within the scope of the following Patent Claims. For example, the extreme positions of both the points of articulation A or C must not be higher or lower than the height of the point of articulation B or D, even if this produces such a great effect as to be practically advantageous, since the effect of the deviation from a purely radial curve will otherwise be more difficult to utilize. It is also possible to conceive two articulated arms 13 and only a single link arm 12. It is also advantageous to execute the pair of points of articulation A, for example, with slightly flexible characteristics, so as to avoid fracture.

I claim:

1. Mechanism for controlling the movement of a viewing mirror in a camera body of a single-lens reflex camera between a viewing position and an exposure position, the mirror having a main plane, a first border and an opposite second border, the first and second borders being connected by side borders, the mechanism including a shaft connected to the camera body and carrying the mirror adjacent to its second border parallel to the same for swinging movement of the mirror between its positions about a first axis provided by said shaft, carrying arms having one end thereof carrying the mirror by means of said shaft and with the other end thereof pivotably connected to the camera body at a second axis at a distance from the first axis and substantially parallel to the same, the main direction of the arms between the first and second axes being transverse to the swinging path of the first border of the mirror and extending outwards of the first axis toward the second border and being adapted, when actuated, to swing with their one ends connected to the mirror in the same direction as the movement of the mirror, moving means including an actuating arm carried by the camera body about a third axis and connected to the mirror at a fourth axis, the third and second axes being substantially parallel to the first and second axis, maneuvering means for swinging the actuating arm around the third axis for swinging of the mirror between its two positions, and stopping means for stopping the swinging movement of the first border of the mirror when it is in its viewing position but allowing transversal movement in the direction of the main plane of the mirror in a direction towards its second border by swinging of the carrying arms to move out of engagement with the stopping means which thereafter allows swinging of the mirror and the actuating arm extending with a main portion thereof from said third axis to said fourth axis in a direction from the first border towards the second border of the mirror transverse to the swinging path of the first border of the mirror.

2. Mechanism according to claim 1, wherein the actuating arm is provided with a second portion on the other side of the third axis in relation to the main portion, the moving means further includes a connecting rod with one end thereof connected to an outer end of the second portion of the actuating arm and with the other end thereof connected to a crank pin provided on a rotable means actuable by means of the maneuvering means to rotate the pin and crank the connecting rod to swing the actuating arm.

* * * * *